June 16, 1959
R. JOUACHIM
2,890,628
MACHINE TOOL
Filed July 8, 1955
2 Sheets-Sheet 1
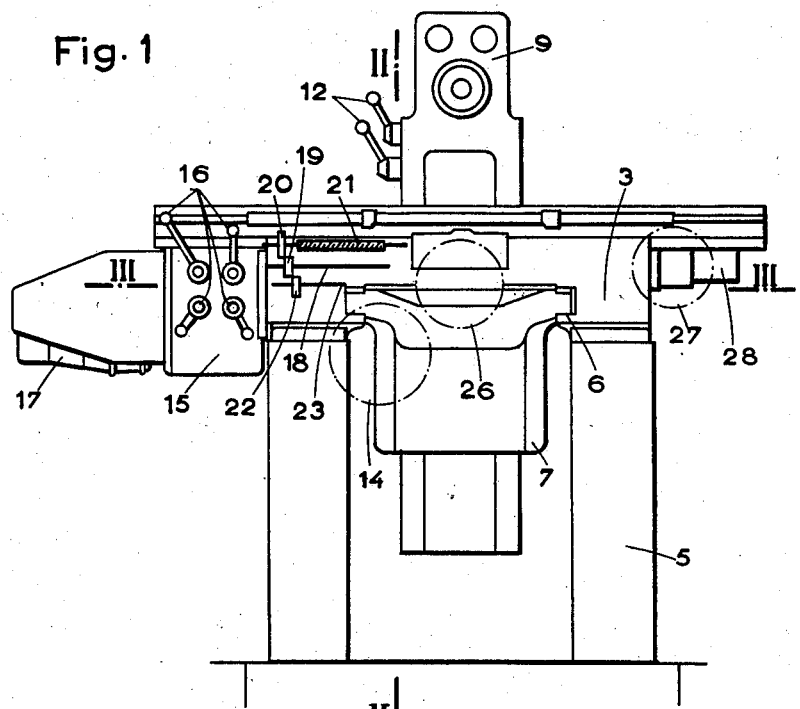
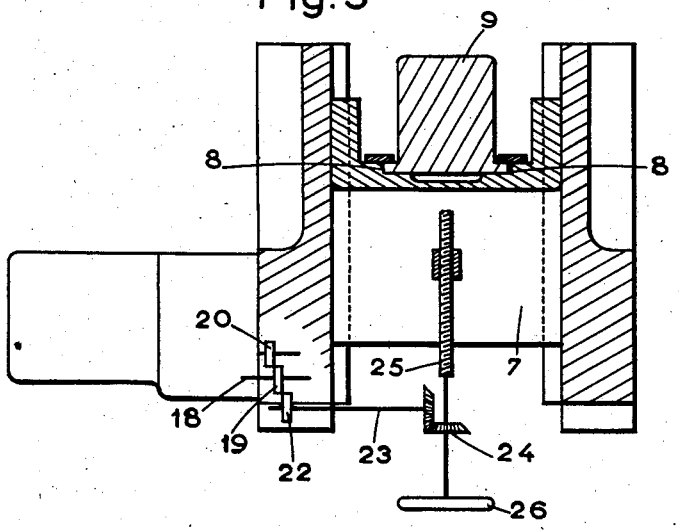
INVENTOR
Raymond Jouachim.
BY
Cameron, Kerkam & Sutton
ATTORNEYS

United States Patent Office 2,890,628
Patented June 16, 1959

2,890,628

MACHINE TOOL

Raymond Jouachim, Saint-Cloud, France, assignor to Societe Anonyme de Vehicules Industriels and d'Equipments Mechaniques (Saviem LRS)

Application July 8, 1955, Serial No. 520,848

Claims priority, application France, July 22, 1954

2 Claims. (Cl. 90—11)

The present invention relates to a machine tool having a table of fixed height, adapted to be used particularly as a milling machine or as a boring machine.

In the known machines of this type, displacements in height of a head stock carrying a spindle are carried out by an upright provided with vertical slides which serve as guides to the head stock, this upright being itself either movable and mounted for this purpose in horizontal slides arranged on the machine base, or fixed and provided with horizontal slides for the head stock, in order to permit the horizontal movement of the spindle in the direction perpendicular to that of the movement of the table.

The machine tool forming the subject of the present invention does not comprise any vertical guide upright for the spindle carrying head stock.

According to the present invention, the machine tool consists of a head stock carrying a motor and driving mechanism for the spindle, the said head stock being guided directly by means of vertical slides in a carriage which in turn is guided in a direction perpendicular to that of the movement of the table by means of horizontal slides provided on the frame which supports the table, below the slides of the latter.

According to another feature of the invention the frame is constituted by a U-shaped cross member the base of which is formed by a beam on which the slides for the table are arranged, the legs of the U being formed by two tracks each of which rests on a support of metal or brickwork and on which the slides of the carriage and of the head stock are arranged.

In the accompanying, more or less diagrammatic, drawings an embodiment of a machine tool according to the invention is illustrated which will be described hereinafter.

In the drawings:

Figure 1 is a front elevation of the machine;

Figure 3 is a plan view in section on line III—III of Figure 1;

Figure 2:
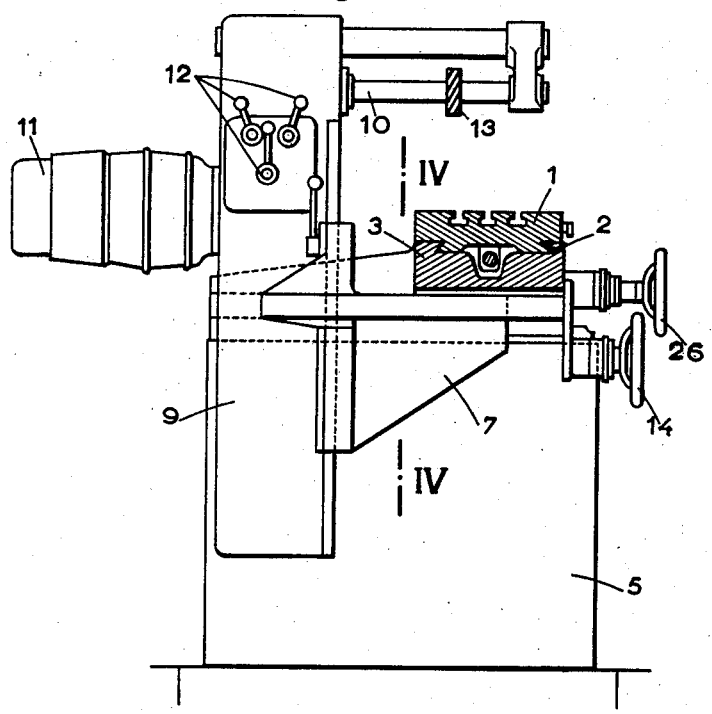
Figure 2 is a section on line II—II of Figure 1.
Figure 4:
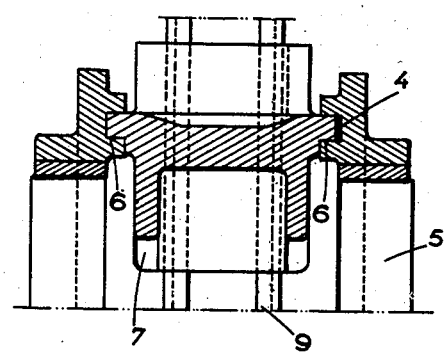
Figure 4 is a section on the line IV—IV of Figure 2.

As shown in Figure 2, the table of the machine is guided in slides 2 provided in a beam 3. This beam connects two tracks 4 (Figure 4) with one another, which are parallel to each other and each of which rests on a support 5 of convenient height. These two supports may be formed of metal or brickwork.

On the inner faces of the tracks 4 which form the legs of a U the base of which is formed by the beam 3, slides 6 are arranged which extend below said beam and serve as a guide for a carriage 7 which is in turn provided with vertical slides 8 (Figure 3) serving as guides for a head stock 9 on which the spindle 10 is mounted which carries the milling cutter 13.

The head stock 9 can accordingly perform, with respect to the table 1, a vertical movement due to the slides 8, and a transverse movement due to the slides 6.

The spindle 10 is driven rotationally by a motor 11, fixed to the head stock 9, by means of a speed change gear box housed in the head stock and controlled by levers 12.

The position of the head stock in height, and consequently the position in height of the milling cutter 13, with respect to the table 1 is controlled by hand by means of a mechanism (not shown) supported by the carriage 7 and operated by a hand wheel 14.

The mechanical movements of the table 1 and of the carriage 7 are driven by means of a gear box controlled by means of levers 16 from a motor 17 fixed at one of the ends of the beam 3.

On the output shaft 18 of the gear box 15 a pinion 19 is mounted which can be brought into mesh either with a gear 20 mounted at the end of the threaded spindle 21 thus effecting the longitudinal movement of the table 1, or with the gear 22 fixedly mounted on a shaft 23 which by means of the bevel gears 24 drives the threaded spindle 25 for the transverse movement of the carriage supporting the head stock 9.

A hand wheel 26 mounted on the end of the threaded spindle 25 permits to operate by hand the transverse movement of the carriage 7, while a hand wheel 27 allows to drive by hand the longitudinal movement of the table 1 by the intermediary of a bevel gear 28 mounted at the end of the threaded spindle 21.

Constructed in this manner the machine offers, as compared with the usual machine of equal output, the essential advantage of a considerable reduction in first costs, requirements of space and weight.

The machine described hereinbefore by way of example may be modified, or supplemented by a suitable accessory such as conventionally used with milling machines or boring machines, without departing from the scope of the invention as defined in the appended claims.

What I claim is:

1. In a machine tool, a fixed frame, horizontal ways secured on said frame, a table of fixed height mounted for movement on said horizontal ways, second horizontal ways secured on said frame beneath said first ways and at right angles thereto and extending the width of said frame, a carriage mounted for movement on said second ways beneath said first ways, vertical ways on said carriage, a headstock mounted for movement on said vertical ways, a spindle carried by said headstock, a milling cutter mounted on said spindle above and over said table and a motor and driving mechanism for said spindle carried by said headstock.

2. A machine tool as described in claim 1 in which said frame includes a U-shaped cross member having a base and legs, said first named horizontal ways being formed on said base, said second named horizontal ways comprising tracks formed in the legs of said U-shaped member and supports for said legs.

References Cited in the file of this patent

UNITED STATES PATENTS

| 2,068,889 | Roehm et al. | Jan. 26, 1937 |
| 2,327,404 | Curtis | Aug. 24, 1943 |
| 2,462,997 | Roush | Mar. 1, 1949 |
| 2,578,113 | Watcher et al. | Dec. 11, 1951 |
| 2,718,819 | Stephan | Sept. 27, 1955 |

FOREIGN PATENTS

| 303,731 | Switzerland | Feb. 16, 1955 |
| 986,951 | France | Apr. 11, 1951 |